United States Patent Office 3,430,640
Patented Mar. 4, 1969

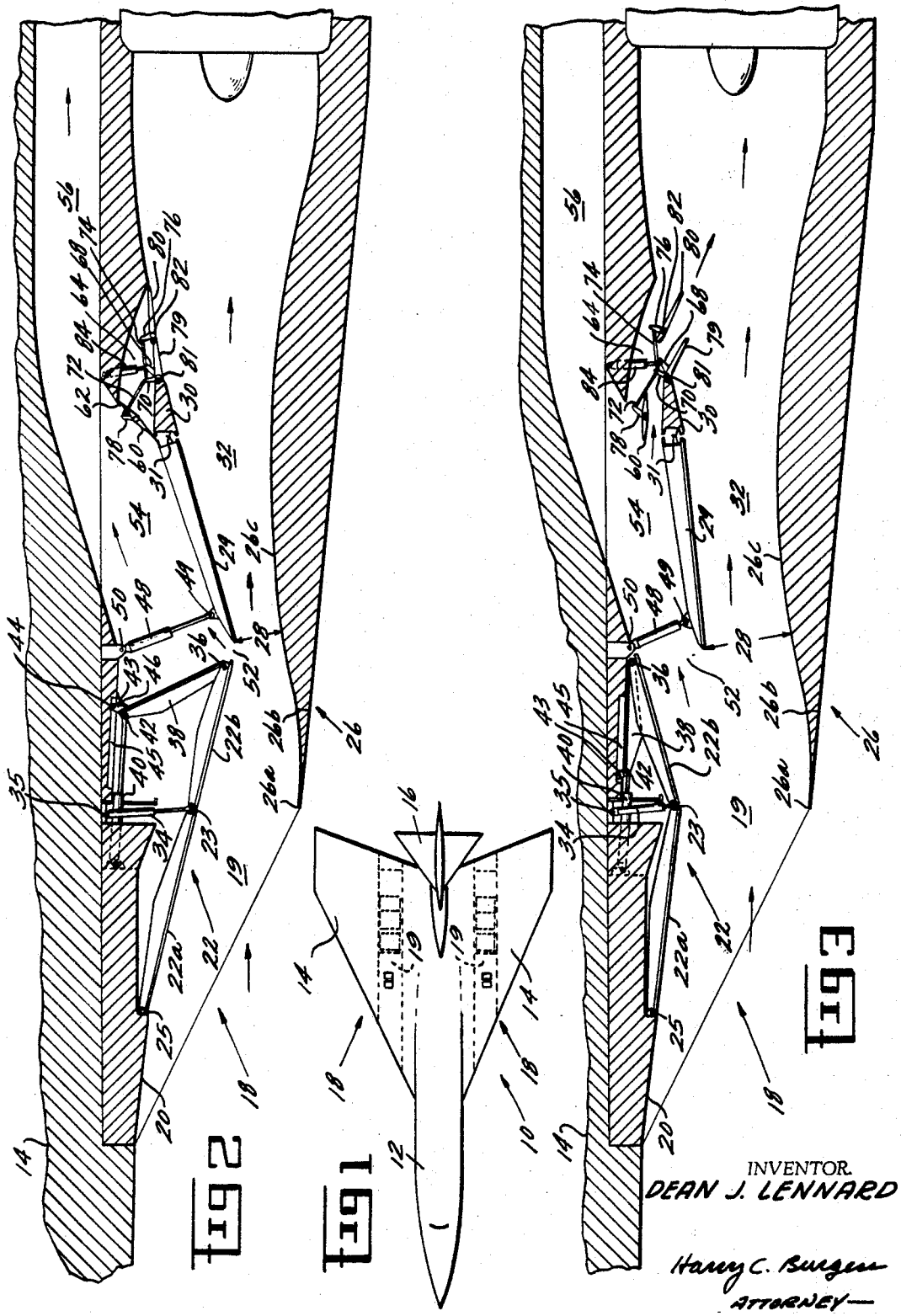

3,430,640
SUPERSONIC INLET
Dean J. Lennard, Cincinnati, Ohio, assignor to General Electric Company, a corporation of New York
Filed Feb. 17, 1964, Ser. No. 345,528
U.S. Cl. 137—15.1    7 Claims
Int. Cl. F02c 7/04; F02k 7/10

This invention relates to supersonic inlets for high speed aircraft and, more particularly to an air inlet having variable geometry wherein there is provided an improved means for matching the air requirements of the engine to that supplied by the inlet.

In the case of turbojet type engines, in particular, for use in high speed supersonic aircraft the air inlet configuration presents difficulties for the designer primarily in the area of flow matching. That is, the more rigid air flow schedule or demand—compared to, say a ramjet—of the typical multi-stage, axial-flow, variable speed compressor dictates a particular compressor (engine) inlet mass air flow at a given operating condition. The mass of air handled by the engine on the other hand, is a direct function of the pressure recovery, i.e., the ratio of the total or velocity energy in the moving supersonic air stream captured by the inlet system to the pressure (static) energy of the air flow in the diffuser (subsonic) portion of the inlet. This is so since, in a turbojet engine, the volume of air ingested during a given period of time can be considered constant for a constant engine r.p.m. Thus, a change in pressure causing a change in density (at constant temperature) can have considerable effect on engine performance by reason of the resultant change—increase or decrease—in mass flow, as engine thrust is generally a function of engine mass flow. The rise in inlet static pressure, which concomitantly increases available net thrust, theoretically has a maximum for a given Mach number of the supersonic airstream. In actual practice pressure recovery never achieves the theoretical maximum. Inlet-engine flow matching must take into consideration these factors, in addition to problems caused by velocity discontinuities (compressor inlet total pressure distortion), flow unsteadiness or "buzz," diffusion and friction losses.

The inlet designer must also, in attempting to achieve optimum air handling capability of the engine, keep in mind the nature of the "shock waves" or discontinuities in air velocity, pressure, density and temperature, which accompany such energy losses. In almost all cases, an inlet operating at supersonic flight speeds will be accompanied by a "normal" shock wave, i.e., one perpendicular to the main flow direction, wherein flow just upstream of the wave is supersonic and just downstream, subsonic. Where the normal shock wave is right at the throat or minimum area of the diffuser, so that all subsonic flow is in the inlet diffuser portion, the inlet is performing at maximum or optimum air handling capacity and operation is said to be "critical." If, on the other hand, the normal shock is located aft of the lip or is swallowed by the diffuser, it is possible to have "supercritical" operation to such an extent that flow velocities are even higher in the inlet than in the free stream, with a concomitant reduction in pressure recovery. Conversely, in "subcritical" operation, the normal shock is regurgitated, i.e., the inlet attempts to deliver more air than is required by the engine—a condition of high "inlet drag" due to the flow spillage losses behind the normal shock wave standing outside the inlet. Where inlet supply exceeds engine demand a determination has to be made by the designer either to accept the spillage loss or, more conventionally, provide means to vary the inlet handling capabilities, depending on the flight regime, such as by ingesting the excess air and by-passing it through auxiliary exhaust ducts.

It must also be considered that the majority of supersonic aircraft in current use are mixed mission aircraft, i.e., a significant portion of flight time is spent at subsonic speeds. Even where the vehicle will cruise at supersonic speeds, however, under take-off and loiter (landing pattern) conditions the inlet optimum size will differ from that at cruise. For example, at the lower flight speeds the inlet throat area typically should be sized about 10% above the optimum aircraft design or mission size to accomplish maximum pressure recovery. Conversely, because of "ram" and other effects, as speed increases in a typical multiple shock inlet matching system compression through the system decreases, as does the effective inlet throat area for a particular inlet capture area, i.e., area at the forward edge or lip of the inlet. As is well known, in decelerating the air to subsonic speeds to permit ingestion by the compressor, it is desirable to provide a normal shock preceded by one or more plane oblique shock waves, i.e, flow discontinuities turning sharply into the axial or horizontal flow line. This will accomplish higher total pressure recovery by reason of a gradual reduction in flow Mach number, as opposed to the sudden change to subsonic across the normal wave. For example, it can be shown that for a practical two-dimensional flow inlet system, two oblique shocks for Mach numbers from about 1.8 to 3.0 and three such shocks for speeds above Mach 3.0 may be required for optimum pressure recovery. Further, location of the shock waves will be dependent on the type of inlet utilized. The known types generally comprise three, namely, (1) all external compression, wherein the oblique shocks are ahead of the inlet cowl or lip (e.g., a conical or axisymmetric three-dimensional flow system), (2) all internal compression, wherein at least one oblique shock is downstream of the lip (e.g., in a two-dimensional, rectangular inlet), and (3) internal-external oblique shock compression. The latter design can provide lower drag oblique shock spillage, attainment of higher pressure recovery and better off-design performance and, in the case of the two-dimensional variety, an inlet of greater flexibility. In other words, the external-internal inlet off-design performance penalty can be less severe than with all external (or internal) compression, since with the normal shock located behind the throat (supercritical operation) some external compression is still available. The phenomenon of duct or inlet "unstarting" accompanies use of such a duct design, however. To explain, an inlet utilizing internal compression operates efficiently only at maximum air flow since it is impossible to stabilize the normal shock in the contracting portion of the inlet. Thus, with the normal shock at or behind the throat and the inlet "started," it may become "unstarted" by the shock jumping suddenly forward of the throat or, more precisely, the inlet lip or cowl. Variation of the throat area and hence, the inlet contraction ratio (ratio of throat area to engine inlet area), through use of variable geometry, can be made to "re-start" the inlet and effectively increase the throat area, which decreases the contraction ratio, to return the inlet mass flow ratio (ratio of mass flow of air at the compressor inlet, or diffuser discharge to mass flow rate of air in the projected stream, or capture area) to the design value. The theoretical limiting "starting" contraction ratio will also be affected by boundary layer growth inside the converging section of the subsonic convergent-divergent inlet diffuser section in a manner so as to reduce the effective throat area. Boundary layer bleed is typically employed to effectively increase the throat area and thus permit "starting" at contraction ratios smaller than the theoretical value. For example, whereas a typical internal compression inlet for a Mach 3.0 vehicle might have an operating throat-to-catpure area ratio of about .4, restarting would require that this area ratio be increased to .7. Adding external compression could reduce the required throat area variation in a variable two-dimensional inlet, for example, to no more than 10% of the inlet capture area. In short, the variable two-dimensional inlet with internal-external compression may be preferred from the standpoint of improved off-design capability.

In light of the above remarks, it will be apparent that for good performance over a wide range of subsonic and supersonic operating conditions a variable geometry, external-internal compression inlet design is preferred wherein means are provided to adjust the "size" of the inlet and wherein, when inlet capacity exceeds engine air demand, the excess air is taken into the inlet duct, to minimize spillage drag due to unsatisfactory positioning of oblique shock waves, and to obtain high inlet pressure recovery. This excess air is then typically by-passed before or around the engine and exhausted overboard. As is known also, however, "additive" drag (or, more properly, reduction in net nacelle thrust) may include by-pass induced drag. For example, where the ingested extra air is by-passed to discharge ports directed substantially axially of the engine (vehicle) momentum (thrust) losses will be dependent on pressure losses in the inlet and, more specifically, in the by-pass system. These losses can be caused by throttling of the by-pass flow. Thus, design of the by-pass flow system can be critical to inlet performance. While it is known that the by pass duct exit area will be inversely proportional to the exit pressure and that the required by-pass exit area is important when a system of flaps is used to regulate by-pass flow, particularly in a submerged system, i.e., where the flaps are located well aft of the inlet lip or cowl opening (on the fuselage) and in the boundary layer, inlet designers have heretofore usually compromised between the higher drag of a short, relatively high angle flap for directing by-pass flow and the weight, actuation load and structural reinforcement required for the longer, lower angle flaps. Further, where it is required to size the inlet so that the throat area variation limits still do not provide sufficient flow area for low losses at take-off and low supersonic speeds, for example, it has been necessary either to considerably lengthen the variable inlet duct walls, commonly called "ramps," or include a separate and independent intake system—in addition to the by-pass system—to provide additional air to the compressor inlet area. It would considerably simplify and reduce the weight and complexity of the bypass and variable inlet ramp arrangement if a primary inlet and a secondary or auxiliary intake and by-pass system could all be incorporated in an integrated system to provide the needed air over a wide range of operating conditions.

Accordingly, it is a general object of the subject invention to provide in a variable geometry supersonic inlet including a by-pass system of low drag characteristics, an improvement wherein extra air flow required at off-design (e.g., take-off and low supersonic speed) operating conditions may be provided with a minimum of additional system components.

A more specific object of the invention is to provide such an improvement wherein a system utilized to provide for boundary layer bleed, and exhaustion of by-pass air before or around the engine includes integral means for achieving maximum flow area through the inlet and into the engine during low flight speeds with minimum internal throat variable geometry length and weight.

Briefly stated, in the disclosed embodiment the invention comprises a two-dimensional flow, variable area supersonic inlet for an aircraft including a large primary inlet opening having a fixed ramp, a forward variable ramp having front and rear sections joined by a floating hinge, a link-bulkhead member pivotally supporting the forward variable ramp at its aft edge, and a rearward variable throat ramp spaced from the forward ramp to provide an air gap. Outwardly of the gap is a chamber which receives by-pass or boundary layer bleed air through the gap to be by-passed before, or around the aircraft engine. The chamber is in flow communication with a secondary air inlet including, at the aft end of the chamber, a smaller secondary inlet opening to the subsonic diffuser section having door means providing low velocity, low loss, secondary inlet air or re-routed primary inlet air from the chamber to the engine during take-off and low flight speeds. An improved door means for boundary layer bleed and by-pass air exhaust is also provided.

These and other objects and advantages of my invention are believed to be clearly pointed out in the appended claims, particularly when read in light of the following detailed description including the drawings of which:

FIG. 1 illustrates schematically a supersonic turbojet powered aircraft having an inlet (or inlets) constructed according to the subject invention;

FIG. 2 illustrates, in cross-section, an inlet incorporating the subject invention, the inlet being in the high supersonic flight speed operating position;

FIG. 3 illustrates, in cross-section, the inlet of FIG. 1 in the subsonic or lower flight speed operating position;

Figure 4:
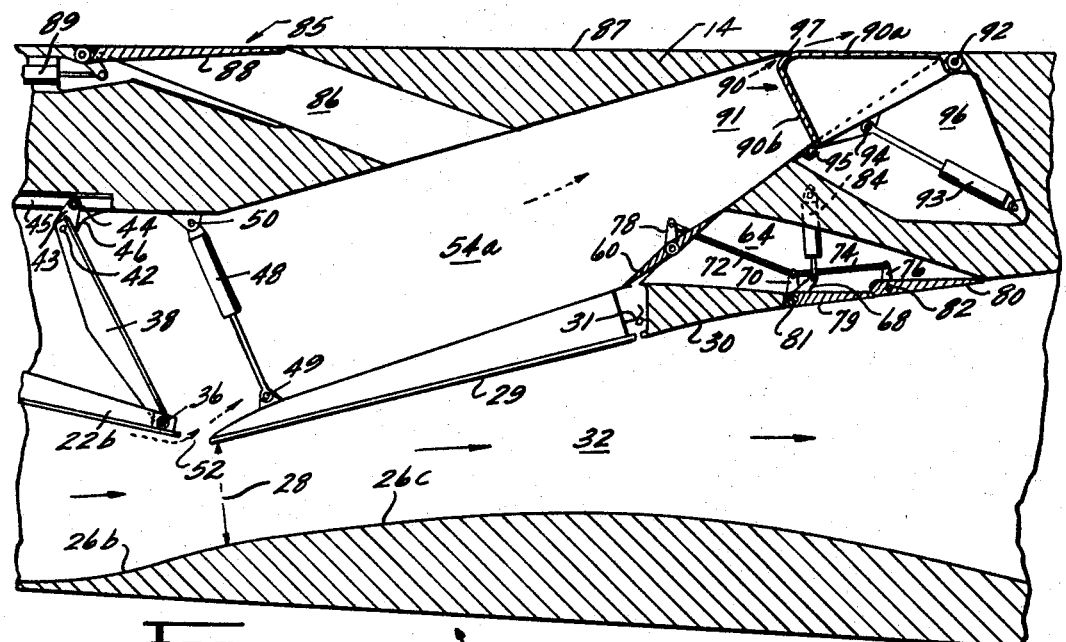
FIGS. 4 and 5 illustrate an alternate embodiment of the variable inlet mechanism, in two-dimensional flow form, in various operating positions, and including the improved by-pass exhaust door means.

It will be understood that while a supersonic, two-dimensional, variable ramp inlet for use with a turbojet is depicted, the invention is not limited solely to such an application and may very well be utilized in other two or three-dimensional flow systems, as well as with other types of fluid-flow engines adapted to power aircraft over a wide range of flight speeds.

Turning now more specifically to FIG. 1, numeral 10 indicates generally an aircraft designed to fly at supersonic, or higher speeds. The aircraft consists of a fuselage 12, wings 14 and a tail section 16. The aircraft depicted includes two identical engine-inlet pod arrangements, indicated generally at 18, one beneath each wing. As seen in FIG. 2, in more detail, the primary inlet, indicated generally at 19, is rectangular, i.e., flow is two-dimensional with the inlet employing external-internal compression, variable geometry, and an integrated secondary air opening and by-pass system to achieve improved engine-inlet matching at subsonic and low supersonic speeds, as well as at take-off. Specifically, numeral 20 illustrates a forward fixed ramp portion, which is followed by a forward movable ramp, indicated generally at 22. The latter comprises a front variable section 22a and a rear variable section 22b. The front and rear sections are pivotally connected in the middle by hinge means 23, the front section being also pivotally connected at 25 at its leading edge to the aft edge of the fixed ramp 20. The forward fixed and movable ramps accomplish external flow compression. Internal compression, on the other hand, takes place along the lower boundary of the inlet formed by the pod underside or wall indicated generally at 26, having a lip 26a followed by a substantially axial or horizontal portion 26b and a curved portion 26c. The latter portion turns the flow—isentropically—into the throat, or diffuser inlet area, as indicated at 28.

Variable geometry is also provided for variation of the throat area or the inlet contraction ratio. In the embodiment shown, there is provided a throat ramp 29 pivotally supported from an inlet duct wall portion or bulkhead 30 by hinge and sealing means 31. The variable throat ramp 29 also forms the upper wall for the initial part of the subsonic diffuser, section of the inlet, indicated generally at 32.

As stated above, adoption of two-dimensional (rectangular) flow deflection can simplify the variable geometry requirements. Thus, the forward movable ramp portions 22a–22b may be positioned by an actuator 34 supported at 35 from the upper wall (inside surface) of the wing. The actuator is pivotally attached to the central hinge point 23 which permits additional travel of the rear section 22b and hence, a larger by-pass air flow, as hereafter described, as well as control of shock position. Pivotally attached to the rear ramp section at 36 is another movable member 38. The latter member is linked to a second actuator 40 pivotally attached thereto at 42 and to a bellcrank 43, which, in turn, pivotally supports the link 38. The bellcrank is itself movably supported at 44 in a track 45 mounted on the pod wall so as to provide fore and aft translation of the bulkhead pivot point 42. The member 38 has a unique dual purpose in that, in addition to serving as an actuation system link, it is also a bulkhead to prevent high pressure reaching the upper surfaces of the two movable sections of the forward ramp 22. This is beneficial in that it permits lower actuation forces and, hence, lighter actuation, control and linking components. Hinge seals are provided at all hinge points 23–25–36–42 together with a sliding seal member 46 to seal the upper portion of the bulkhead-link member 38 to the upper pod wall surface.

An additional actuator 48 is pivotally attached at 49 to the variable throat member 29, the actuator, in turn, being supported at 50 from the upper duct wall to permit maximum throat variation in accordance with the requirements of the primary inlet opening.

Turning now to one of the primary features of my invention, there is provided between the rear edge of forward variable ramp rear section 22b and the front edge of throat ramp 29 a gap 52 through which the air passes to a large chamber, indicated at 54. Boundary layer air will be bled from the upper ramp surfaces through the gap and exhausted through a duct 56 in the pod upper wall (or wing's lower surface) leading to the variable jet exhaust (ejector) nozzles (not shown) at the rear of the pod or nacelle. At the lower Mach number flight speeds these same nozzles exhaust by-pass flow, also entering the chamber 54 through gap 52.

In keeping with a primary object of my invention, located at the aft end of the chamber 54 is a variable chamber wall member or flap in the form of a "butterfly" door 60. When in the position shown in FIG. 1, the door forms a continuation of the by-pass convergent flow-path through chamber 54 as it mates with a sealing portion of ramp 29 and is faired into the pod wall structure, at point 62. Aft of the "butterfly" door 60 is a secondary air inlet passage, indicated at 64, for re-routing a portion of the primary inlet air in the embodiment of FIG. 1 back into the subsonic diffuser passage 32. Thus, the flap 60 is connected through a series of link members 68–70–72–74 to doors 79–80 in the upper wall of the diffuser passage 32. The doors 79–80 are pivotally supported in a slightly overlapping, faired arrangement (when closed) by hinge-seal means, indicated at 81 and 82. Hydraulic motor means 84 may be used to actuate the by-pass door and link system for increased damping, or the system may be simply pressure actuated as a result of the changing inlet area and diffuser flow conditions.

Thus, for operation at sea level static (SLS) conditions, at take-off, and at low flight speeds, where the inlet throat area ramp 29 does not open sufficiently to allow optimum flow area in the diffuser section, i.e., not enough air is supplied through the primary inlet 19, by-pass air entering chamber 54 through gap 52 is re-routed back to the engine through the "secondary" inlet duct passage 64 as shown in FIG. 3. It will be understood that in the latter case, the alternative to use of the present invention would be to provide an extremely long, highly loaded flap in place of the short, easily actuated ramp 29 to accomplish an equivalent flow area to that shown. This would be undesirable, as stated, since it would increase weight, complicate the actuation and control system. Note also that no air enters passage 56 in the FIG. 3 position as the passage is effectively blocked at the jet exhaust nozzle areas not shown.

Figure 5:
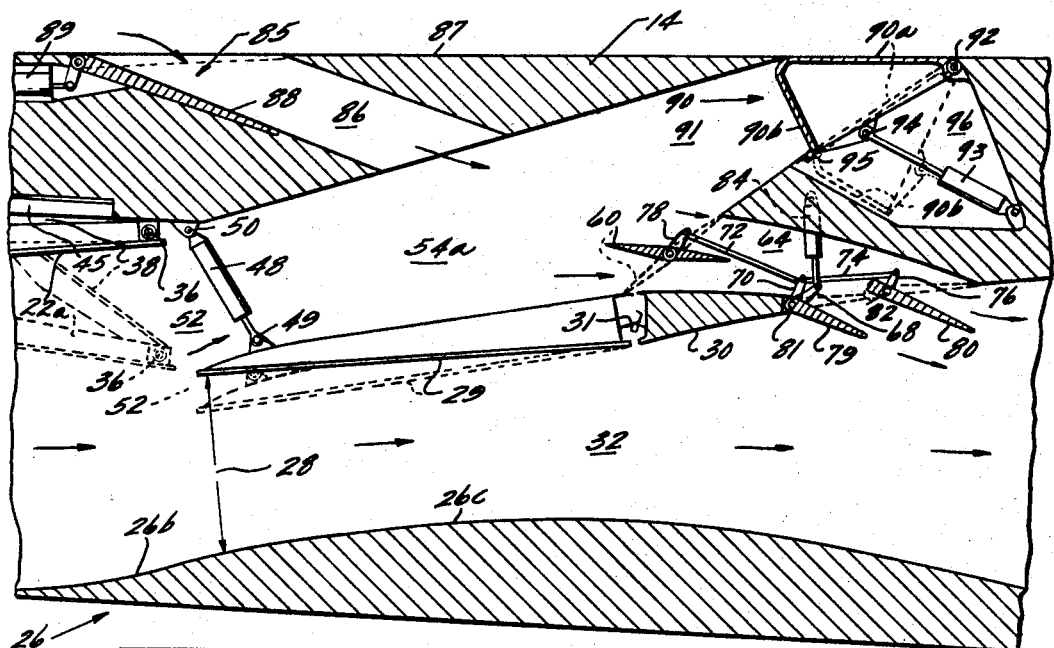

In the embodiment of FIGS. 4–5, on the other hand, a secondary air inlet arrangement is provided wherein an opening, indicated generally at 85, admits additional air to chamber 54a at take-off, for example, to improve inlet pressure recovery. Opening 85 leads to a short, parallel-sided duct 86 blocked off by a flapper door 88 flush-mounted with the wing (or fuselage) outer surface 87 when closed. An actuator 89 is used to position the flapper door, shown in the closed position, i.e., the inlet is in the supersonic cruise (design) regime with boundary layer bleed only through gap 52.

It should also be noted that in a boundary layer bleed or by-pass system there will be a need for efficient exhausting of the varying quantities of excess air at a small angle relative to the engine axis to cut down throttling and other losses. A preferred exhaust system is also one wherein aerodynamic as well as mechanical requirements, e.g., low weight and low actuation force, can be optimized. In the embodiment shown, a hinged door indicated generally at 90 is provided having a unique double sealing face. Thus, outer face 90a forms a part of the wing (or nacelle) surface when the door is closed, while the forward face 90b closes off the short convergent oblique exhaust passage, indicated at 91. The described arrangement insures that most of the aerodynamic gas load is transmitted to hinge means 92 with the result that the actuation force supplied by motor means 93 pivotally attached to the door at 94, can be relatively small. This arrangement also permits an extremely low discharge angle—relative to the engine (nacelle) centerline—to reduce by-pass drag. A seal 95 is provided primarily to block leakage flow into the actuator cavity 96. Preferably no seal is utilized at the door rounded edge at 97 since some boundary layer bleed will occur at all times. Door movement for bleed may be controlled by automatic pressure sensing means (not shown) operatively connected to the motor means 93. As shown in FIG. 4, during the lower flight speeds (i.e., subsonic) it will be necessary to provide increased flow area. With door 88 open, secondary low velocity flow is provided which, with the unique re-routing system provided by the invention, can be ducted to the engine through passage 64. Thus, in addition to the enlarged primary opening 19, resulting in low pressure losses, and the advantages presented by the shortened throat ramp arrangement depicted herein, I improve inlet total pressure recovery through an integrated secondary inlet (air source) and by-pass re-routing system. In this configuration door 90 remains closed. As shown in the dotted lines, however, at intermediate and higher off-design speeds, the door 90 will exhaust by-pass air overboard in varying amounts and, thus, reduce losses associated with spillage.

I have, therefore, provided an inlet having high performance over a wide range of aircraft flight Mach numbers and, specifically, means for throat area variation together with a by-pass system minimizing variable ramp weight and inlet length while eliminating need for separate secondary inlet and by-pass systems where required, the invention also featuring an improved exhaust port arrangement for ducting excess air overboard.

It is understood that any changes or modifications to the invention as shown in the disclosed embodiments which would be obvious to those skilled in the art are intended to be included within the scope of the appended claims.

What is claimed as new and desired to be secured by Letters Patent of the United States is:

1. In a jet engine air intake for supersonic aircraft having a longitudinal axis and including a plurality of transverse, spaced, relatively movable wall members forming a primary intake passage converging to a throat area and thereafter diverging in a diffuser portion to the engine inlet, means for varying the air intake contraction ratio by movement of said wall members and including a gap formed between adjacent wall members, said gap being variable in area to regulate external bypass flow over a wide range of operating Mach numbers to enhance intake pressure recovery, and means for re-routing at least a portion of the bypass flow from said gap back into the primary passage for improved off-design operation.

2. In a jet engine air intake for supersonic aircraft having a longitudinal axis and including a plurality of transverse, spaced, relatively movable wall members forming a primary intake passage converging to a throat area and thereafter diverging in a diffuser portion to the engine inlet, means for varying the air intake contraction ratio by movement of said wall members and including a gap formed between adjacent wall members, said gap being variable in area to regulate external bypass flow over a wide range of operating Mach numbers to enhance intake pressure recovery, and means for re-routing at least a portion of the bypass flow from said gap back into the primary passage for improved off-design operation including an auxiliary passage in flow communication with said gap and said diffuser portion and means for opening and closing said auxiliary passage in response to changing flow conditions in said primary passage.

3. In a jet engine air intake for supersonic aircraft, said intake having a longitudinal axis and including a plurality of transverse, spaced, relatively movable spaced wall members forming a primary intake passage converging to a throat area and thereafter diverging in a diffuser portion to the engine inlet, means for varying the air intake contraction ratio by movement of said spaced wall members including a gap formed between adjacent wall members, said gap being variable in area to regulate external bypass flow over a wide range of operating Mach numbers to enhance overall intake pressure recovery, means internally bypassing flow back into the intake diffuser passage for improved operation at low flight speeds including an auxiliary air passage between the diffuser and a chamber in flow communication with the variable area gap, and closure means operable in response to changing flow conditions in said primary intake passage to open and close said auxiliary passage to control both the external and the internal bypass flow.

4. In a jet engine air intake for supersonic aircraft, said intake having a longitudinal axis and including a plurality of transverse, spaced, relatively movable, wall members forming a primary intake passage converging to a throat area and thereafter diverging in a diffuser portion to the engine inlet, means for varying the air intake contraction ratio by movement of said spaced wall members including a gap formed between adjacent wall members, said gap being variable in area to regulate external bypass flow over a wide range of operating Mach numbers to enhance overall intake pressure recovery, means internally bypassing flow back into the intake diffuser passage for improved operation at low flight speeds including an auxiliary air passage between the diffuser and a chamber in flow communication with the variable area gap, and closure means operable in response to changing flow conditions in said primary intake passage to open and close said auxiliary passage, said closure means comprising a first pivotable flap member at one end of said auxiliary passage and forming a portion of the chamber wall in the closed position, and a plurality of flap members at the other end of said passage and overlapping to form a section of the diffuser portion wall in the closed position, and link means interconnecting said flap members.

5. In a jet engine air intake for supersonic aircraft:
   a fixed ramp portion;
   a forward variable ramp portion having pivotally connected front and rear sections, said front section also being pivotally connected to said fixed ramp portion at the rear edge thereof;
   an aft variable ramp portion spaced from said rear section to provide an air gap;
   means for varying the intake throat area at the forward edge of said aft variable ramp and the size of said gap to permit varying quantities of external bypass flow to enter a chamber located outwardly of the ramp portions of said intake;
   and means for re-routing at least a portion of said external bypass flow back into the primary intake flow path including an auxiliary passage leading from said chamber to a subsonic diffuser section of said intake, and a plurality of closure means operable in response to changing flow pressures in said chamber and diffuser to open and close said auxiliary passage.

6. In a jet engine air intake for supersonic aircraft, said intake having a longitudinal axis and including a plurality of transverse, spaced, relatively movable spaced wall members forming a primary intake passage converging to a throat area and thereafter diverging in a diffuser portion to the engine inlet, means for varying the air intake contraction ratio by movement of said spaced wall members including a gap formed between adjacent wall members, said gap being variable in area to regulate external bypass flow over a wide range of operating Mach numbers to enhance overall intake pressure recovery, an integrated secondary air inlet-bypass system comprising:
   a large chamber in flow communication with said variable area gap;
   a second air intake passage leading to said chamber;
   an exhaust passage in said chamber located downstream of said secondary inlet passage;
   an auxiliary passage connecting said chamber with said primary intake passage diffuser portion; and
   closure means selectively operable to open one or more of said passages while closing the other of said passages including a plurality of operatively interconnected flapper doors located in said auxiliary passage, said flapper doors in the closed position partially forming the chamber and diffuser walls, respectively, and in the open position re-routing external bypass air entering the chamber through said gap to said engine;
   said secondary intake passage and said exhaust passage closure means being selectively operative, respectively, to provide additional air for said diffuser and blocking of said exhaust passage in the event of re-routing of said bypass air.

7. An air intake for a turbojet-powered aircraft adapted for flight at relatively high Mach numbers, said air intake being formed between terminal portions of aircraft aerodynamic structure and including:
   a forwardly located fixed ramp portion;
   a forward variable ramp having a front section and a rear section pivotally attached to each other at their aft and forward edges, respectively, said front section also being pivotally connected to the rear edge of said forwardly located fixed ramp portion;
   a variable throat ramp having a forward and an aft edge, said forward edge being spaced from the aft edge of said rear section to provide a gap therebetween, said throat ramp aft edge being pivotally supported by said aircraft structure;
   a second fixed ramp portion having an axial section followed by an isentropic section, said forwardly located fixed ramp portion, said forward variable ramp, and said variable throat ramp being spaced from said second fixed ramp portion to provide a primary intake passage having in series-flow relation a convergent portion, a throat area, and a subsonic diffuser portion for ducting air to said turbojet engine; and
   an integrated secondary air inlet-bypass system comprising:
   a large chamber outwardly of said variable ramps in flow communication with said gap;

a secondary intake passage in said aerodynamic structure leading to said chamber;
an exhaust passage leading from said chamber and located downstream of said secondary intake passage,
an auxiliary passage leading from said chamber to said subsonic diffuser portion; and
closure means selectively operable to open one or more of said passages while closing the other of said passages including a plurality of operatively interconnected flapper doors located in said auxiliary passage, said flapper doors in the closed position partially forming the chamber and diffuser walls, respectively, and in the open position re-routing external bypass air entering the chamber through said gap to said engine;

said secondary intake passage and said exhaust passage closure means being selectively operative, respectively, to provide additional air for said diffuser and blocking of said exhaust passage in the event of re-routing of said bypass air.

References Cited

UNITED STATES PATENTS

| | | | |
|---|---|---|---|
| 2,840,332 | 6/1958 | Griffith | 60—35.6 |
| 2,938,334 | 5/1960 | McLafferty | 60—35.6 |
| 2,966,028 | 12/1960 | Johnson et al. | 60—35.6 |
| 3,030,770 | 4/1962 | Ranard et al. | 60—35.6 |

ALAN COHAN, *Primary Examiner.*